United States Patent [19]

Mason

[11] 4,017,198
[45] Apr. 12, 1977

[54] PIVOTAL CONNECTION
[75] Inventor: Henry Stanford Mason, Castlecrag, Australia
[73] Assignee: H. S. Mason Pty. Limited, Australia
[22] Filed: June 3, 1975
[21] Appl. No.: 583,482
[30] Foreign Application Priority Data
June 27, 1974 Australia ............... 7992/74
[52] U.S. Cl. ............... 403/43; 403/299; 403/301; 403/165; 29/517
[51] Int. Cl.² ............... F16B 7/06
[58] Field of Search ............... 403/43, 44, 46, 48, 403/164, 165, 299, 343, 306, 307, 301; 29/517

[56] References Cited
UNITED STATES PATENTS

| 1,072,425 | 9/1913 | Candee | 403/46 |
| 1,815,420 | 7/1931 | Sauvage | 403/46 |
| 2,233,901 | 3/1941 | Scacchetti | 403/44 X |
| 2,813,733 | 11/1957 | Herrmann | 403/44 |
| 3,701,550 | 10/1972 | Jacobson | 403/48 X |
| 3,923,406 | 12/1975 | Iritz | 403/43 |

FOREIGN PATENTS OR APPLICATIONS 11,738 8/1888 United Kingdom ............... 403/165

Primary Examiner—Wayne L. Shedd
Attorney, Agent, or Firm—Ladas, Parry, Von Gehr, Goldsmith & Deschamps

[57] ABSTRACT

This invention relates to an improved pivotal coupling in which the rotational connection between the two coupling parts is defined by a cylindrical portion on one coupling part having a plurality of axially spaced circumferential grooves formed on the outer wall thereof and engaged by a plurality of complementary ridges formed on the inner wall of a bore formed in the other coupling part to contain the two parts against relative axial movement without restricting rotational movement therebetween.

5 Claims, 5 Drawing Figures

PIVOTAL CONNECTION

BACKGROUND OF THE INVENTION

The engineering field often presents situations where it is necessary to couple two components together in a manner whereby relative axial movement is not desired while rotational movement and axial adjustment are required.

One means whereby this function is achieved is the conventional turnbuckle in which the axial adjustment is achieved by a threaded eye bolt located in a threaded aperture at one end of the main body while rotational movement is achieved by rotatably securing fixing means at the opposite end of the body.

The conventional turnbuckle is in many cases quite satisfactory. It does not, however, lend itself to use in situations where compactness is a prime requirement.

Couplings of the general type to which this invention relates fall into two classes, namely the high and the low class couplings. The high class couplings are usually produced for use in situations where high loading capability together with relatively low rotational friction losses is a specific requirement. For this reason the high class couplings are complicated and expensive. The low class couplings are relatively simple and inexpensive to manufacture but cannot contend with high loads without suffering the undesirable high rotational friction losses. Thus, it will be seen that there is a specific requirement for a pivotal coupling which is suitable for use in both high loading and low loading situations and is economical to produce.

THE PRIOR ART

During the preparation of this specification consideration was given to the following prior art which deals with methods and apparatus for the manufacture of pivotal couplings and similar devices and with couplings produced by those methods and by other methods.

The book "Chipless Machining" by Charles H. Wick, 1960 Edition, published by the Industrial Press of New York, deals with methods of cold forming ferrous metals including swaging. Reference to Page 202 of this book will provide those skilled in the art with a broad outline of the methods commonly used in the production of couplings and like devices, by rotary swaging and like methods.

U.S. Pat. No. 1,663,784 by W.H. Washburne filed Mar. 10, 1924, describes and illustrates a method of making a two-piece valve in which the head of the valve is deformed under a pressing action to force the wall of an aperture therethrough into engagement with a grooved portion on a valve stem. The purpose of this deformation is to cause the ridges formed on the stem to impact the wall surface of the aperture so that the metal of the wall will flow into the grooves to rigidly lock the valve stem and the head together.

U.S. Pat. No. 2,488,566 by R.S. Sperry filed Aug. 18, 1945, describes and illustrates a method of making a pull rod which involves the step of forcing a tube into a tapered aperture so that the end portion of the tube is swaged inwardly to engage a tapered threaded portion of a mandrel mounted in the aperture so that the material of the wall of the tube will impact the helical ridge of the thread and flow into the groove, thereby forming an internal tapered thread on the end of the tubular pull rod.

U.S. Pat. No. 2,870,465 filed Aug. 22, 1957, by R.A. Kraus et al describes and illustrates a method of die-forming internal threads. This method involves the step of placing a bush or like component on a threaded mandrel and forcing the mandrel through a tapered aperture so that the overall diameter of the bush will be physically reduced to cause the material of the bush to flow into the groove of the thread thereby forming an internal thread on the bush.

U.S. Pat. No. 1,479,121 by W.H. Washburne filed Oct. 24, 1921, describes and illustrates a method of forming a two-piece valve which is similar in many respects to the method disclosed in U.S. Pat. No. 1,663,784.

The following prior art references are detailed to provide those skilled in the art with a reasonable understanding of the methods used in the manufacture of convention pivotal couplings.

U.S. Pat. No. 1,003,355 to B.H. Green filed June 29, 1910, describes and illustrates a turnbuckle comprising a tubular body having an internally threaded portion at one end for receiving a threaded eye bolt providing the means whereby axial adjustment of the coupling is achieved. The opposite end of the tubular body is swaged by conventional rolling methods to engage with a knuckle spigot on an eye piece thereby providing the means whereby rotational movement is permitted.

U.S. Pat. No. 1,223,546 by W.H. Williams filed Oct. 10, 1914, describes and illustrates a coupling device which is constructed in a similar manner to the Green Turnbuckle.

U.S. Pat. No. 1,418,298 by T.J. Gorman filed Dec. 29, 1919, describes and illustrates a longitudinal rod adjustment in which a clevis member is provided with an enlarged head section and a hexagonal adjusting nut in which there is formed a recess, the recessed portion is split longitudinally and spread so that the enlarged portion of the clevis may be received therein to allow the split portion of the nut to be restored to its original position so that a shoulder means at the end of the recess engages behind the enlarged portion of the clevis, thereby allowing the adjuster nut to rotate relative to the clevis.

U.S. Pat. No. 1,465,065 by J.H. Stern filed on Nov. 29, 1921, describes and illustrates an adjuster device in which a clevis is provided with an aperture which receives a shank portion of an adjuster nut, the shank portion of the nut is retained within the aperture by means of an enlarged head portion thereby allowing relative rotation between the clevis and the adjuster nut.

U.S. Pat. No. 3,085,306 by J. Drysdale filed June 24, 1960, describes and illustrates a strayrod which comprises a body having an internal threaded portion on each end thereof, one of these internal threaded portions providing the means whereby a cable attached to the opposite end of the body may be tensioned. The attachment of the cable to the opposite end of the body is achieved by a flanged nut which is located over a threaded spigot so that the threaded spigot when received in the threaded portion enables relative rotation between the body and the nut. The nut in turn is coupled to a cable clamp so that the body may be rotated independently of the cable.

U.S. Pat. No. 3,633,951 by Hinkle et al filed Mar. 3, 1970, describes and illustrates a rod end coupling in which an internally threaded body is retained within a tubular body by opposing helical grooves formed in the external surface of the internally threaded body and into which the material of the internal wall of the tubular body is caused to flow by means of roll swaging.

SUMMARY OF THE INVENTION

The present invention revolves around the principal of forming a plurality of axially spaced grooves on the external surface of a cylindrical member and inserting the cylindrical member thus grooved into the bore of a second member in which a plurality of axially spaced circumferential ridges have been formed and which have a diameter approximate the maximum external diameter of the cylindrical member, so that when the second member is reduced in overall diameter the complementary ridges and grooves on each of the members will engage with each other to prevent the axial removal of one member with respect to the other but allow rotational movement therebetween. As the second member is reduced in overall diameter to engage the grooves and ridges, the length thereof increases thus changing the relationship between the pitch of the grooves on the first member and the pitch of the ridges on the second member. This change in length results in it becoming difficult to rotate one member relative to the other.

This rotational difficulty is avoided by compensating for the change in pitch relationship. This is achieved by reducing the pitch dimension of the ridges in the bore so that when the diameter of the bore is reduced the pitch dimension increases as the axial length increases. This pitch compensation allows the designer to select the parameters required to produce a particular type of pivotal coupling according to requirements.

OBJECTS OF THE INVENTION

It is a principal object of the invention to provide an improved pivotal connection of the type in which the connection pivots about the longitudinal axis thereof.

It is another object of this invention to provide a new and improved pivotal connection which is capable of use in substantially all situations where axial load and rotational motion is required.

BRIEF DESCRIPTION OF THE DRAWINGS

Notwithstanding any other forms that may fall within its scope the invention will hereinafter by described by way of example only in one preferred form with reference to the accompanying drawings of which, FIG. 5 is fragmental longitudinal sections illustrating some examples of groove and ridge profiles that may be utilised in the performance of the invention.

A PREFERRED FORM OF THE INVENTION

Figure 1:
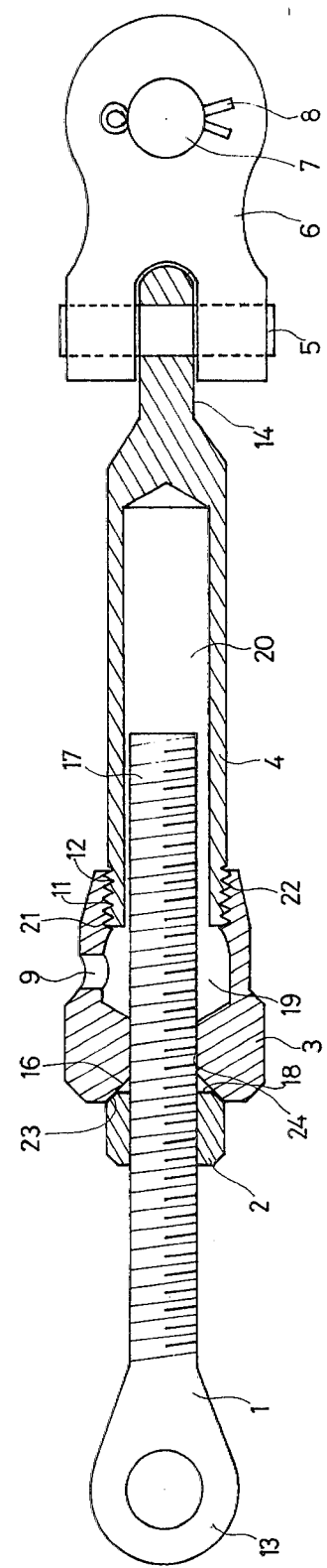
FIG. 1 is a longitudinal sectional illustration of a turnbuckle incorporating the pivotal connection of the invention.

A preferred form of the invention is a turnbuckle comprising an externally threaded member 1 having an eye piece 13 or like suitable fixture device at one end, the threaded portion 17 of the member 1 is received in an internally threaded aperture 18 and a first member 3.

The first member 3 provides the means whereby a cable or like device attached to eye piece 13 may be rotatably and adjustably secured to another component by means of a member 4 which is rotatably connected to the first member 3. The member 4 is provided with an eye piece 14 which may be secured pivotally to a jaw or toggle 6 by clevis pin 5. The jaw or toggle 6 may be secured to an anchor point by means of a clevis pin 7 and cotter pin 8.

It will be appreciated by those skilled in the art that the inventive step resides in the provision of a pivotal coupling which may be economically produced and which is substantially capable of contending with relatively high axial loadings. In this regard the only specific requirements of the invention are that the member 4 be provided with a cylindrical portion on which a number of axially spaced circumferential ridges and grooves may be formed and that the member 3 be provided with a bore in which a number of complementary ridges and grooves may be formed. The member in which the bore is formed must, of course, have a cross-sectional dimension and a length sufficient to enable a swaging operation to be performed to complete the coupling.

In the form illustrated in FIG. 1 the connection between the members 3 and 4 is achieved by forming on the free end of the member 4 a plurality of alternate circumferential ridges and grooves indicated 11 and 21 respectively. The member 3 has a bore or recess 19 on the side wall of which are formed a plurality of complementary alternate circumferential ridges and grooves 12 and 22 respectively which are engaged with the ridges and grooves 11 and 21 on the member 4. The ridges 11 and 12 and the grooves 21 and 22 should be so dimensioned and arranged as to permit a small degree of axial and lateral movement whereby relative rotation between the members 3 and 4 is not unduly impeded.

The configuration of the ridges 11 and 12 may be selected according to the requirements of the user. For example where the connection is to be used in circumstances where axial load will be experienced in one direction only the configuration may be the buttress formation. Where axial load may be experienced in both directions, acme, whitworth or unified formations may be used. Selection of the desired formation depends greatly upon the size of the members 3 and 4 and the use to which the connection is to be put.

To provide adequate means for adjustment and locking of the turnbuckle illustrated in FIG. 1, the member 4 is provided with a central passage 20 which enables the threaded portion 17 of the eye bolt 1 to pass coaxially therein when the turnbuckle is reduced to its minimum overall length. Locking of the eye bolt 1 in its selected position is achieved by means of nut 2 which has a tapered or coned portion 23 on face 24 which engages with a complementary internally tapered portion 16 on the member 3.

The turnbuckle as shown in FIG. 1 should be provided with a sight hole 9 in the member 3 so that the user may ensure that the threaded portion 17 is entered a sufficient distance into the member 3. Additionally, to avoid hydraulic locks and permit moisture drain a similar hole may be formed in the member 4, (not shown).

In production it is desirable that a particular method be used to produce the grooves and ridges and to effect the interconnection between them. If for example the ridges and grooves are formed on a lathe by standard turning procedures a relatively rough surface will be obtained which will be detrimental to the rotational movement between the members 3 and 4. Similarly methods such as stamping and casting will not produce a surface texture or finish which is ideal for the purpose. Thus although the aforementioned methods may be used it is preferable that the grooves and ridges be roll formed to obtain the best possible finish.

Figure 2:
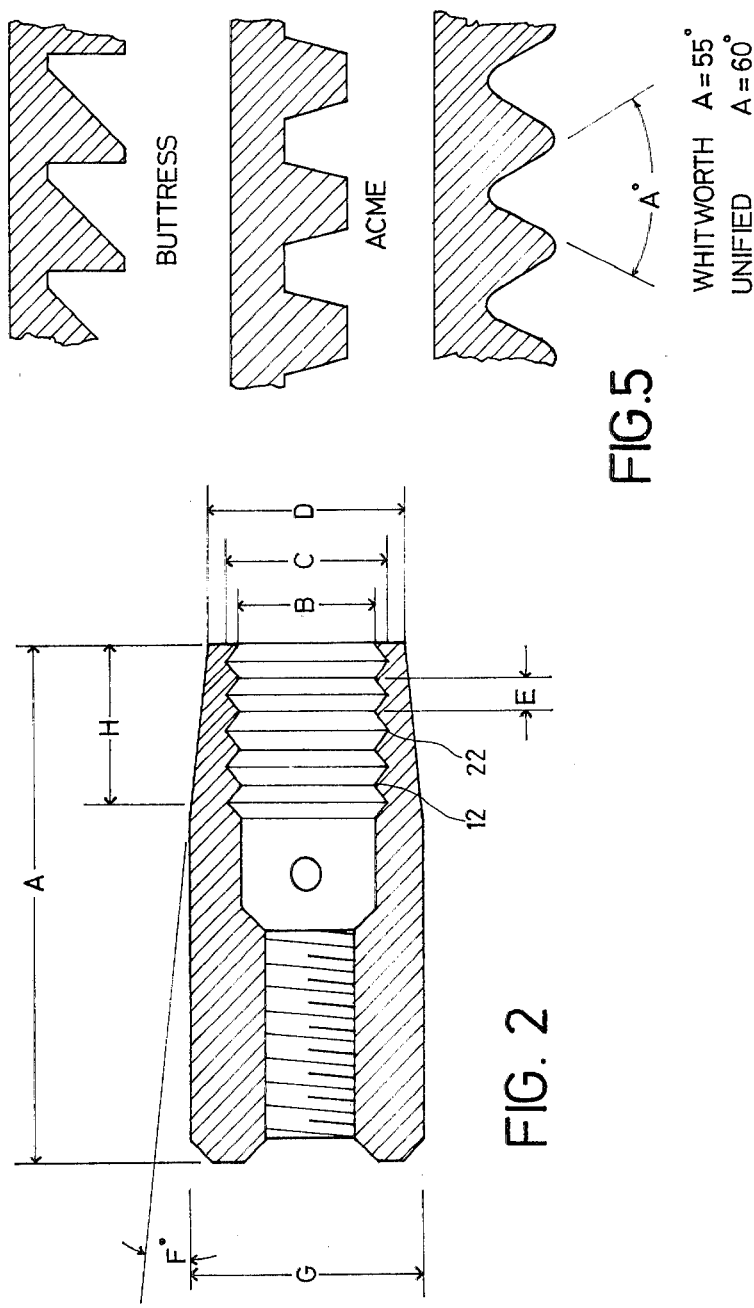
FIG. 2 is a longitudinal illustration of one of the members of the pivotal connection in the turnbuckle of FIG. 1.

The best known method for the production of the member 3 and member 4 will hereinafter be described with reference to FIG. 2 which is a cross-sectional illustration of member 3 showing the important dimensions in reference letters.

It will of course be appreciated that the indicated dimensional parameters will vary according to the type and class of material used and the method used in making the connection.

Figure 4:
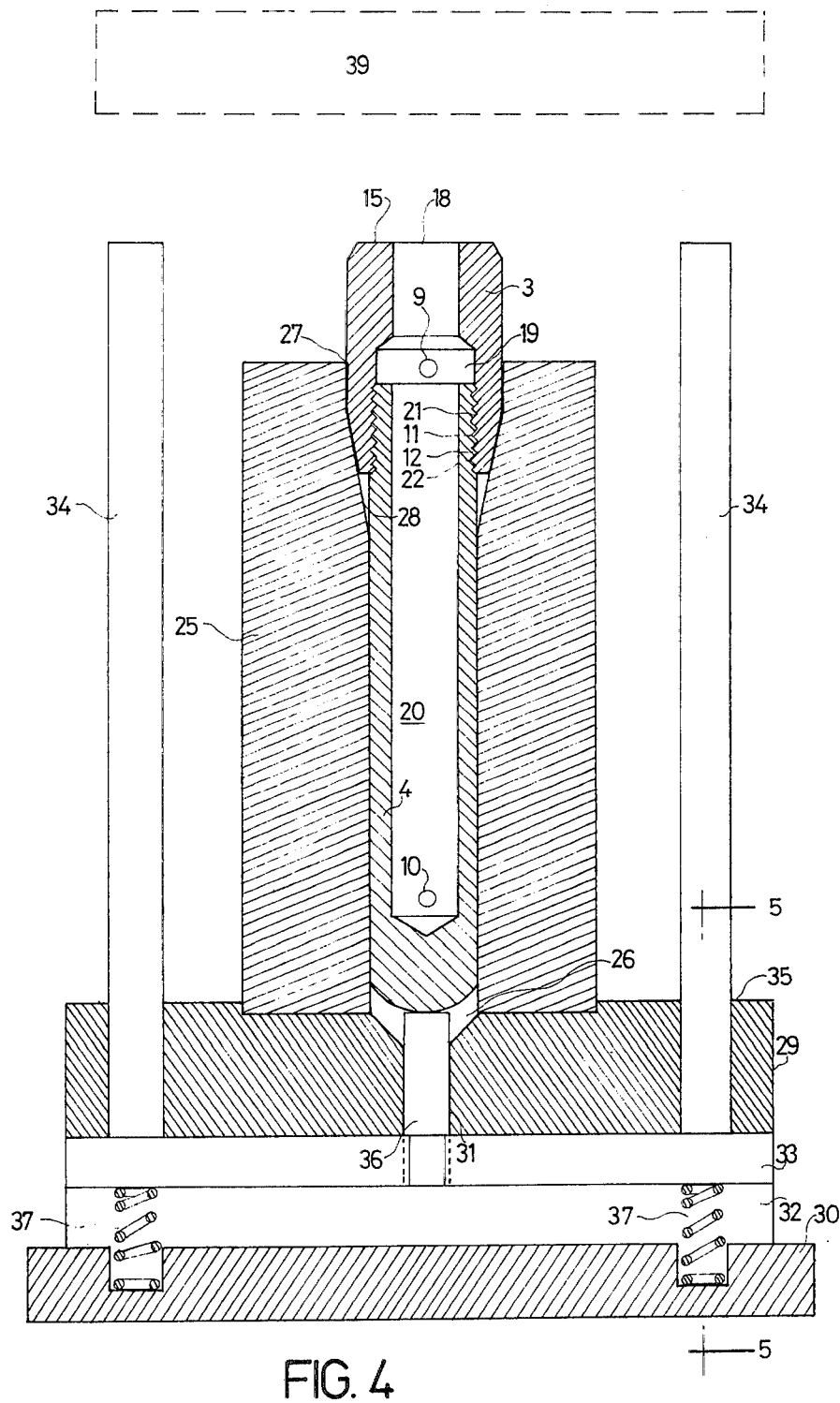
FIG. 4 is a sectional elevation of an assembly apparatus used in the manufacture of a pivotal connection in accordance with this invention.

The method found to be the best at the present time requires the use of a die and press arrangement, the die being that shown in FIG. 4. Basically the die comprises a rectangular member 25 having a cylindrical passage 26 extending vertically through it from top to bottom. The upper end 27 of the passage 26 is provided with an upwardly divergent portion 28. The taper of this divergent portion 28 should be the same as the taper angle 'F' on member 3 (see FIG. 2). In practice, Angles from 5° to 12° have been successfully used.

The die 25 is mounted on a plinth member 29 which is in turn mounted on a base 30 which has a vertical aperture 31 aligned coaxially with the passage 26 in the die 25. The underside of the plinth member 29 is provided with a lateral upwardly projecting slot 32 in which a cross bar 33 is located.

Connected to the cross bar 33 are stroke pins 34 which project upwardly through passages 35 in the plinth to a point above the upper end 27 of the die 25. These stroke pins are adapted to be engaged by the press ram 39 during its downward stroke to move the crossbar 33 in the downward direction by a distance equal to the stroke of the ram 39. Also mounted on the cross bar is a spigot 36 which projects upwardly therefrom into the passage 26 in the die 25. The spigot 36, stroke pins 34 and crossbar are urged towards the upper position by springs 37. Thus it may be seen from FIG. 3 unimpeded motion of the crossbar 33 in the vertical direction is allowed while the side walls 38 of the slot 32 prevent transverse or tilting movement thereof.

The member 3 may, for marine turnbuckle use, be formed from hexagonal stock naval brass to British Standard Specification No. 251 while the member 4 should preferably be formed in stainless type 316.

Although it is possible to calculate the theoretically required stroke of the press ram 39 to achieve a given reduction in the minor diameter 'B' for any given angle F°, a number of other factors affect the length of stroke required and the resulting increase in length of the tapered portion of member 3 which will occur during the swaging process. These factors are, the surface finish and the ductility of the metal in the tapered portion of member 3, the surface finish on the die in the area of contact, and the amount of "springback" which occurs after the press ram has completed its stroke.

During the development of the invention the following method was devised to determine the required pitch compensation and press stroke for a given design.

This method has proved to be reliable over a range of sizes of turnbuckle made to the general configuration of FIG. 1. The number, pitch and configuration of grooves on the member 4 are determined by usual engineering design methods having regard to the required load capacity. The load capacity of the coupling is the same as the capacity of a nut and tubular bolt assembly of the same diameters and number, pitch and configuration of groove or thread, in the same metal.

Figure 3:
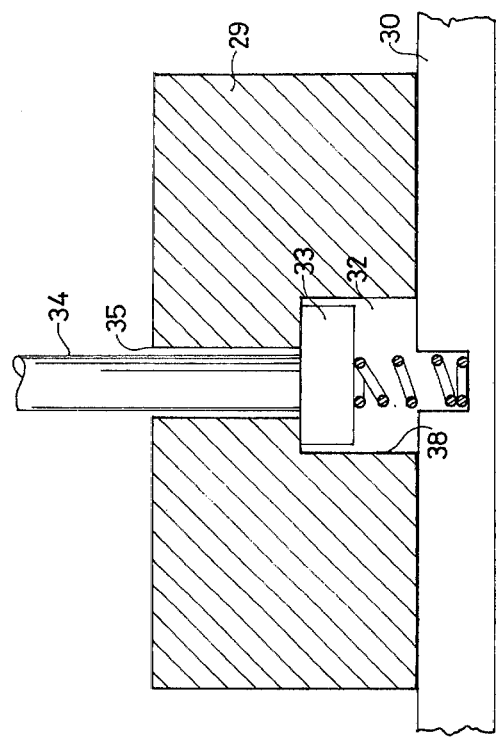
FIG. 3 is a fragmental illustration of a resistive motion member used in the assembly of a pivotal connection constructed in accordance with the invention.

The member 3 is designed to match the load capacity of member 4. Several samples are made complete in all respects except that the groove 21, FIG. 3, are not formed or machined. The minor diameter 'B' is made an easy clearance fit over the major diameter of the grooves of the member 4.

The taper F° is made the same as the taper 28 of the assembly die 5 (FIG. 4). The angle F may be selected with regard to appearance, weight, or other criteria, but the length of the taper should be at least equal to the length of the grooved portion of member 4. In practice, angles from 5° to 12° have proved satisfactory.

One sample member 3 is now placed in the die 25 as shown in FIG. 4 except that the member 4 is not placed in the die. The press ram is lowered until contact is made with the top face 15 of the member 3. Further downward movement of the press ram is made and measured, pushing member 3 into the die and decreasing its minor diameter B. The press ram is raised, member 3 taken out of the die, and the minor diameter 'B' is measured. The process is repeated on the same sample until diameter 'B' is such that an easy clearance fit over the minor diameter of the grooves of member 4 is achieved. At this stage there may be a slight taper in the bore 19 in the region that is to be grooved, and this may now be corrected by a small adjustment to either the taper in the die or the taper of the sample. The swaging process is repeated on a new sample until the passage 19 is parallel in the region that is to be grooved, and gradually blended into the original internal diameter where the sight hole 9 is located.

The increase in length due to the swaging process is now measured. See tables 1 and 2.

It will be apparent to those skilled in the art that this increase in length has occurred in the swaged portion of member 3, and having been measured the correct pitch may be now calculated, as illustrated by the following table.

EXAMPLE 1

Turnbuckle nominal size ¼ UNF — Refer FIG. 1 (17).

Determination of pitch of member 3 to give correct engagement for a member 4 having 6 grooves of 60° unified configuration.

Pitch .041666 Major dia. .397" Minor Dia. .350".
DIMENSION OF MEMBER 3 (see FIG. 2) DIE ANGLE 10° MATERIAL NAVAL BRASS TO BS251

| BEFORE SWAGING | AFTER SWAGING |
| --- | --- |

| -continued | | |
|---|---|---|
| Stock Dia. 'G' Hex | .625" | .625" |
| Nose Angle F° | 10° | 10° |
| Bore Dia. 'B' | .400" | .365" |
| Length Dimension 'A' | .875" | .884" |
| Taper Length 'H' | .264 | .273 |

The Press stroke required was 0.095 inches. Die Angle correction was so small it could not be measured accurately enough to record.

The required pitch of the grooves to be machined in member 3 is found by multiplying the pitch of member 4 by the ratio of the length of the swage metal before and after swaging, i.e., $$0.041666 \times 0.264/0.273 = 0.0403 \text{ inches}$$

A cutter with this pitch was made and annular grooves of 60° unified form, were machined in further Samples of member 3.

A member 4 was placed in the die 25 and the height of the spigot 36 adjusted in the cross bar 33 so that when member 3 was placed in the die the grooves in members 3 and 4 were in a mating position. With the stroke of the press set to punch the assembly of 3 and 4 into the die 25 for a distance of 0.095 inches, perfect engagement was achieved.

It is worthy of comment that prior to the experiment to determine pitch correction in member 3, assembly of the same size but without pitch correction gave erratic results in tensile tests, member 3 pulled off member 4 at tensile loads of between 1800 and 2400 lbs. After the pitch was compensated in member 3 no failures below 3600 lbs. pull have occurred in the many tests made.

EXAMPLE 2

Turnbuckle nominal size 5/8.

Determination of pitch of member 3 to give correction for a member 4 having 9 grooves of 55°, Whitworth configuration.

Pitch .05555 (18 per inch). Major Dia. 1.031.
Minor Dia. .965.
DIMENSION OF MEMBER 3. DIE ANGLE 7°. MATERIAL NAVAL BRASS CHROME PLATED.

| | BEFORE SWAGE | AFTER SWAGE |
|---|---|---|
| Stock Dia. 'G' Hex | 1.480 | 1.480 |
| Nose Angle F° | 7° | 7° |
| Bore Dia. 'B' | 1.034 | .980 |
| Length Dimension 'A' | 1.840 | 1.851 |
| Taper Length 'H' | .518 | .529 |

Stroke Required .244"
Required pitch = .05555 × .518/.529 = .0544
Test Results - No failure at 24,800 lbs. pull.

SUMMARY OF PITCH CORRECTION

To determine correct pitch of the grooves to be formed in member 3:

1. Make a sample of member 3 with dimension B equal to the major diameter of the grooves formed on member 4 plus a clearance of 0.001 inch to 0.003 inch.
2. Machine taper F on member 3 to a length equal to the length of the grooved portion on member 4.
3. Position sample member 3 in assembly die and press into die until the diameter of bore 19 is decreased to give a clearance over the minor diameter of the grooves of member 4 equal to the clearance normally required on screw threads.
4. Compare dimension A after swaging with the dimension before swaging.

Utilising the results of these steps the pitch correction for a particular coupling may be found from the equation $$P4 \ H1/H2 = PC$$

where P4 equals the pitch of the grooves machined on member 4, H1 equals the dimension H before swaging and H2 equals the dimension H after swaging.

In designing a pivotal coupling, the cumulative pitch compensation of all the grooves in member 3 must be less than one half of one pitch, otherwise assembly difficulties will be experienced.

The nose dimension D (FIG. 2) and dimension G must be selected with regard to dimension C. If dimensions D and G are incorrectly selected the material thickness between dimension C and the outer surface of the taper portion H will be too little or too great thereby incurring difficulties in assembly or resulting in a coupling which may not have sufficient axial load bearing capabilities.

What I claim is:

1. A turnbuckle including a first member adapted to be attached to eye means, a second member, means including a rod having disparate connecting means on one end thereof with its other end threaded into said second member, and means connecting said members for relative rotation about a common axis and for containing said members against relative axial movement wherein said connection means comprises a cylindrical portion on one member disposed within a bore on the other member, a plurality of discrete annular grooves in said cylindrical portion, a plurality of discrete annular grooves formed in the inner wall of said bore, said grooves in each member being disposed in closely spaced axial relationship along the respective members to provide an annular radially projecting ridge between each pair of grooves, the separate ridges on each member providing a plurality of annular substantially frustoconical axial load bearing surfaces engaging complementary annular axial load bearing surfaces of the other member.

2. A turnbuckle as in claim 1, wherein the ridges on one member have a cross section profile which is the complement of the grooves in said one member.

3. A turnbuckle as in claim 2, wherein each ridge on one member has one annular axial load bearing surface which is substantially perpendicular to the common axis of the connection and one annular load bearing surface which is frustoconical, the ridges on the other said member having a perpendicular wall and a frustoconical wall engaging with respective perpendicular and frustoconical load bearing surfaces of the said one member.

4. A turnbuckle as in claim 2, wherein both load bearing surfaces of each ridge are frustoconical.

5. A turnbuckle as in claim 4, wherein the root of each groove and the crest of each ridge are curved in cross section.

* * * * *